(12) United States Patent
Conner et al.

(10) Patent No.: US 6,380,870 B1
(45) Date of Patent: Apr. 30, 2002

(54) APPARATUS, METHODS, AND COMPUTER PROGRAM PRODUCTS FOR DETERMINING A LOOK AHEAD DISTANCE VALUE FOR HIGH SPEED FLIGHT

(75) Inventors: Kevin J Conner, Kent; Steven C. Johnson, Issaquah, both of WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/495,979

(22) Filed: Feb. 1, 2000

Related U.S. Application Data

(60) Provisional application No. 60/118,183, filed on Feb. 1, 1999.

(51) Int. Cl.$^7$ ............................................. G08B 23/00
(52) U.S. Cl. ..................... 340/970; 340/961; 340/963; 340/969; 342/65; 701/4; 701/9; 701/301
(58) Field of Search ................................ 340/970, 963, 340/961; 701/9, 14, 4, 301; 73/178 T; 244/180, 181; 342/65

(56) References Cited

U.S. PATENT DOCUMENTS

| 3,715,718 A | 2/1973 | Astengo ...................... 340/970 |
| 3,925,751 A | 12/1975 | Bateman et al. ............ 340/967 |
| 3,934,221 A | 1/1976 | Bateman et al. ............ 340/970 |
| 3,934,222 A | 1/1976 | Bateman et al. ............ 340/970 |
| 3,936,796 A | 2/1976 | Bateman et al. ............ 340/970 |

(List continued on next page.)

FOREIGN PATENT DOCUMENTS

| CA | 1033828 | 6/1978 | .................... 343/15 |
| DE | 4304561 A | 8/1994 | ........... B64D/45/04 |
| DE | 4327706 A1 | 2/1995 | ............. G08G/5/04 |
| EP | 0790487 A2 | 8/1987 | ............. G01C/23/00 |
| FR | 2689668 | 10/1993 | ............. G08G/5/04 |
| FR | 2721130 | 12/1995 | ............. G08G/5/04 |
| GB | 2 266 286 A | 10/1993 | ........... B64D/45/04 |
| WO | WO 85/03566 | 8/1985 | ............. G01C/5/00 |

OTHER PUBLICATIONS

Moller and Sachs, "Synthetic Vision for Enhancing Poor Visibility Flight Operations," *IEEE AES Systems*:27–42, 1994.

Rueb, et al., "Evaluation of the C/EC/KC–135 Ground Collision Avoidance System (GCAS) (Study 2)," *Integrated Engineering and Tech. Management Directorate*, Wright–Patterson AFB, Final Report, 1993.

(List continued on next page.)

*Primary Examiner*—Brent A. Swarthout

(57) ABSTRACT

The present invention provides several apparatus, methods, and computer program products for determining a look ahead distance value for use in a ground proximity warning system. Specifically, the present invention provides apparatus, methods, and computer program products that generate a candidate look ahead distance value that provides a constant reaction time for varying aircraft speeds. The apparatus of the present invention includes a processor that generates the constant reaction time look ahead distance by multiplying a desired reaction time by the speed of the aircraft. This constant reaction time look ahead distance value is compared by the processor to other candidate look ahead distance values that have variable reaction times for varying aircraft speeds. If the aircraft is traveling at a relatively high speed, the processor of the present invention selects the constant reaction time look ahead distance value for use in the ground proximity warning system. Importantly, because the present invention switches from a variable reaction time look ahead distance value to a constant reaction time look ahead distance value when the aircraft is travelling at higher speeds, the present invention can provide a look ahead distance value that reduces nuisance alarms for lower speeds, while also providing at least a minimum reaction time for higher speeds.

18 Claims, 9 Drawing Sheets

U.S. PATENT DOCUMENTS

| | | | |
|---|---|---|---|
| 3,944,968 A | 3/1976 | Bateman et al. ............. | 340/970 |
| 3,947,808 A | 3/1976 | Bateman ..................... | 340/970 |
| 3,947,810 A | 3/1976 | Bateman et al. ............. | 340/970 |
| 3,958,218 A | 5/1976 | Bateman ..................... | 340/970 |
| 3,958,219 A | 5/1976 | Bateman ..................... | 340/970 |
| 4,030,065 A | 6/1977 | Bateman ..................... | 340/970 |
| 4,060,793 A | 11/1977 | Bateman ..................... | 340/970 |
| 4,063,073 A | 12/1977 | Strayer ....................... | 364/439 |
| 4,215,334 A | 7/1980 | Bateman ..................... | 340/970 |
| 4,224,669 A | 9/1980 | Brame ........................ | 364/433 |
| 4,319,218 A | 3/1982 | Bateman ..................... | 340/970 |
| 4,484,192 A | 11/1984 | Seitz et al. ................. | 340/995 |
| 4,567,483 A | 1/1986 | Bateman et al. ............. | 340/970 |
| 4,642,775 A | 2/1987 | Cline et al. ................. | 364/443 |
| 4,646,244 A * | 2/1987 | Bateman et al. ............. | 340/963 |
| 4,675,823 A | 6/1987 | Noland ....................... | 364/460 |
| 4,835,537 A | 5/1989 | Manion ...................... | 340/961 |
| 4,894,655 A | 1/1990 | Joguet et al. ............... | 340/988 |
| 4,903,212 A | 2/1990 | Yokouchi et al. ...... | 364/449.95 |
| 4,912,645 A | 3/1990 | Kakihara et al. ........ | 364/449.2 |
| 4,914,436 A | 4/1990 | Bateman et al. ............. | 340/970 |
| 4,914,733 A | 4/1990 | Gralnick ..................... | 340/961 |
| 4,916,448 A | 4/1990 | Thor .......................... | 340/970 |
| 4,924,401 A | 5/1990 | Bice et al. ............ | 364/424.015 |
| 4,947,164 A | 8/1990 | Bateman ..................... | 340/968 |
| 4,954,959 A | 9/1990 | Moroto et al. ........... | 364/449.5 |
| 4,987,413 A | 1/1991 | Grove ........................ | 340/970 |
| 5,086,396 A | 2/1992 | Waruszewski, Jr. ......... | 364/454 |
| 5,136,512 A | 8/1992 | Le Borne ................... | 364/461 |
| 5,140,532 A | 8/1992 | Beckwith, Jr. et al. ..... | 395/101 |
| 5,153,588 A | 10/1992 | Muller ....................... | 340/968 |
| 5,155,688 A | 10/1992 | Tanaka et al. ............... | 364/454 |
| 5,157,615 A | 10/1992 | Brodegard ................... | 364/461 |
| 5,196,847 A | 3/1993 | Bateman ..................... | 340/970 |
| 5,202,690 A | 4/1993 | Frederick ..................... | 342/26 |
| 5,220,322 A | 6/1993 | Bateman et al. ............. | 370/970 |
| 5,252,978 A | 10/1993 | Priestley ...................... | 342/29 |
| 5,257,195 A | 10/1993 | Hirata .................... | 364/449.95 |
| 5,265,025 A | 11/1993 | Hirata ..................... | 364/449.7 |
| 5,285,391 A | 2/1994 | Smith, Jr. et al. ........... | 364/443 |
| 5,293,163 A | 3/1994 | Kakihara et al. ........... | 340/995 |
| 5,293,318 A | 3/1994 | Fukushima ............ | 364/449.95 |
| 5,337,242 A | 8/1994 | Yamamoto et al. ...... | 364/449.2 |
| 5,414,631 A * | 5/1995 | Denoize et al. ............. | 340/963 |
| 5,442,556 A | 8/1995 | Boyes et al. ................ | 364/461 |
| 5,486,821 A | 1/1996 | Stevens et al. ............. | 340/970 |
| 5,488,563 A | 1/1996 | Chazelle et al. ............ | 364/461 |
| 5,495,249 A | 2/1996 | Chazelle et al. .............. | 342/36 |
| 5,519,392 A | 5/1996 | Oder et al. ................. | 340/995 |
| 5,526,000 A | 6/1996 | Chazelle et al. ............ | 342/407 |
| 5,555,175 A * | 9/1996 | D'Orso | |
| 5,581,259 A | 12/1996 | Schipper ..................... | 342/451 |
| 5,608,392 A | 3/1997 | Faivre et al. ............... | 340/967 |
| 5,638,282 A | 6/1997 | Chazelle et al. ............ | 364/461 |
| 5,661,486 A | 8/1997 | Faivre et al. ................. | 342/33 |
| 5,677,842 A | 10/1997 | Denoize et al. ............. | 364/461 |
| 5,798,712 A * | 8/1998 | Coquin ....................... | 340/970 |
| 5,839,080 A | 11/1998 | Muller et al. .................. | 701/9 |

OTHER PUBLICATIONS

Shah, "Ground Collision Warning System Performance Criteria for High Maneuverability Aircraft," *Flight Stability and Control Branch* Wright Patterson AFB, 1988.

Stevens, "Teprom Helps Low–Altitude Flight,: Terrain__ Navigation System for Flying at Low Height," *Elektronica* 1986, (Dutch) w/English Transl.

"Safety Through Interactions and International Standards," *Proceedings of the Flight Safety Foundation*, 46th Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled Flight Into Terrain (CFIT)," *Defense Systems & Electronics Group*, Texas Instruments, Inc. IEEE, 1993.

"Technology and Air Attack," *Asian Defense Journal*, 1993, Computer Printout.

Proctor, "Terrain Alert Graphics Tested on cockpit Displays," *Aviation Week & Space Technology, Aug. 8, 1994*, p. 51.

Malm, Richard, "Engineers Can Tap Into Global Positioning System" *Engineering Times*, Apr., 1995, pp. 11–14.

The F–16 Digital Terrain System, British Aerospace, The Institute of Electrical Engineers, 1995.

"Terrain Databases and Their Use In Navigation and Collision Avoidance," Institute of Electrical Engineers, Electronics Division Colloquim, Professional Group E15, Radar Sonar and Navigation Systems, *Digest No. 1995/066*, 1995, paper by Allerton.

Kuchar and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ASL, Department of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Avoidance Technique (GOCAT)," *IEEE*, May, 1991.

Moore, "We Have the Technology," *Flying Safety*, Jun., 1992.

Hughes, "Glass Cockpit Study Reveals Human Factors Problems," *Aviation Week & Space Technology*, Aug. 7, 1989.

Hoffman and Burnham, "Airborne Electronic Map systems," *IEEE*, 769–772, 1981.

Burnham and Kline, "Airborn Electronic Terrain Map System, Part 2–Applications," *IEEE*, 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE*, 773–778, 1981.

Small, "The Electronic Terrain Map—A New Avionics Integrator–," Avionics Laboratory, Wright–Patterson Air Force Base, Ohio, 356–359.

Tang and Mealy, "Application of Multiple Model Estimation Techniques to a Recursive Terrain Height Correlation System," *IEEE*, 757–764, 1981.

Woodward and Hoover, "Passive Terrain Following Using Stored Map and Global Positioning System," *IEEE*, 779–785, 1981.

"Air Force Evaluating Model of Electronic Map Technology," *Aviation Week & space Technology, 76*, Dec. 19, 1983.

Kuchar and Hansman, Jr., "An Exploratory Study of Plan–View Terrain Displays for Air Carrier Operations," *The International Journal of Aviation Psychology,* 3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated Nov. 1995 (12 pages).

Fitzsimmons, "First moves towards an "intelligent" GPWS," *Interavial/Aerospace World,* 1993.

Grey and Dale, "Advances in Techniques and Technologies for Air Vehicle Navigation and Guidance," *NATO Advisory Group for Aerospace Research and Development (AGARD),* Guidance and Control Panel 48$^{th}$ Symposium, 1989.

Hewitt, "The Use of Terrain Databased for Avionic Systems," *The Institution of Electrical Engineers,* 1995.

Hopkins et al., "Quo Vadis?," *Flight International* 11–17:37–40, Mar., 1992.

"GCAS—Past, Present and Future of Alert Systems for Abnormal Closure to Ground," *Abstract,* 1993, translation by Kei Kino. (Japanese Article with English Translation).

Kuchar and Hansman, Jr., "Part–Task Simulator Evaluations of Advanced Terrain Dislay," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems,* San Diego, California. IEEE National Aerospace and Electronics Conference, 1988.

Bennett and Cockburn, "Pilot Monitoring of Display Enhancements Generated From A Digital Data Base," *AGARD Conference Proceedings No. 456,* 1990.

Bennett, "The Use of Digital Map Data to Provide Enhanced Navigation and Displays for Poor Weather Penetration and Recovery," *GEC Marconi Avionics,* 1993.

Bice, "Development of an Automated Ground Collision Avoidance System Using A Digital Terrain Database," *Wright Patterson AFB,* 1989.

DiPadua et al., "Comparison of the General Dynamics Ground Clobber Algorithm with the GCAS and Laws Algorithms," *Crew Station Design Facility, Wright Patterson AFB,* 1988.

Fitzgerald and Brunner, "Use of High–Fidelity Simulation in the Development of an F/A–18 Active Ground Collision Avoidance System," *SAE International,* 1992.

Baldwin et al., "GPS–Based Terrain Avoidance Systems—A Solution for General Aviation Controlled Flight into Terrain," *Rannoch Corporation,* (date unknown).

Bateman, "How to Terrain–proof the World's Airline Fleet," *Sundstrand Data Control. Flight Safety Foundation,* 44$^{th}$ IASS, Singapore, 1991.

GCAS Publication, provided by A/S Library Services, Source and Date Unknown, pp. 185–190.

* cited by examiner

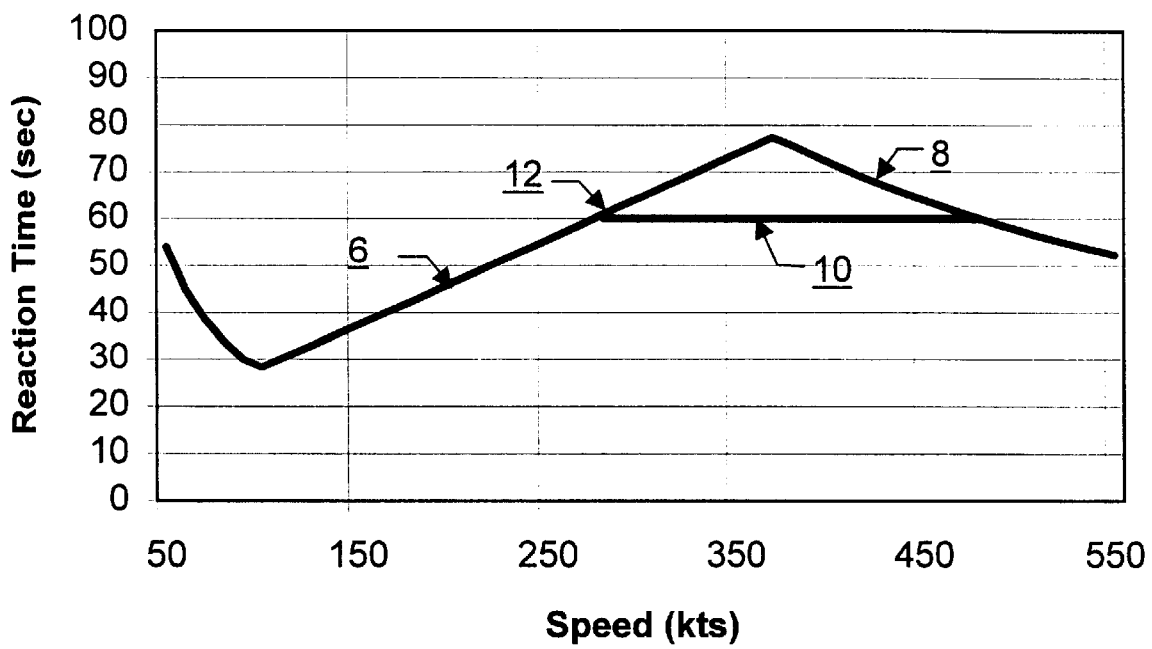
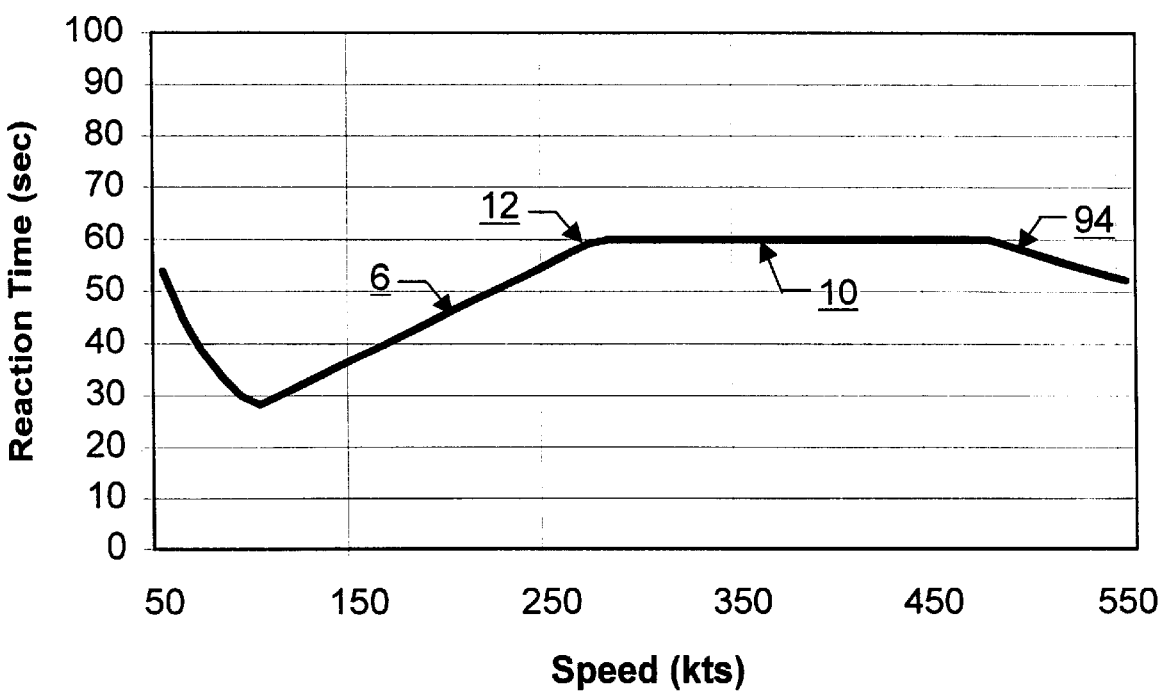

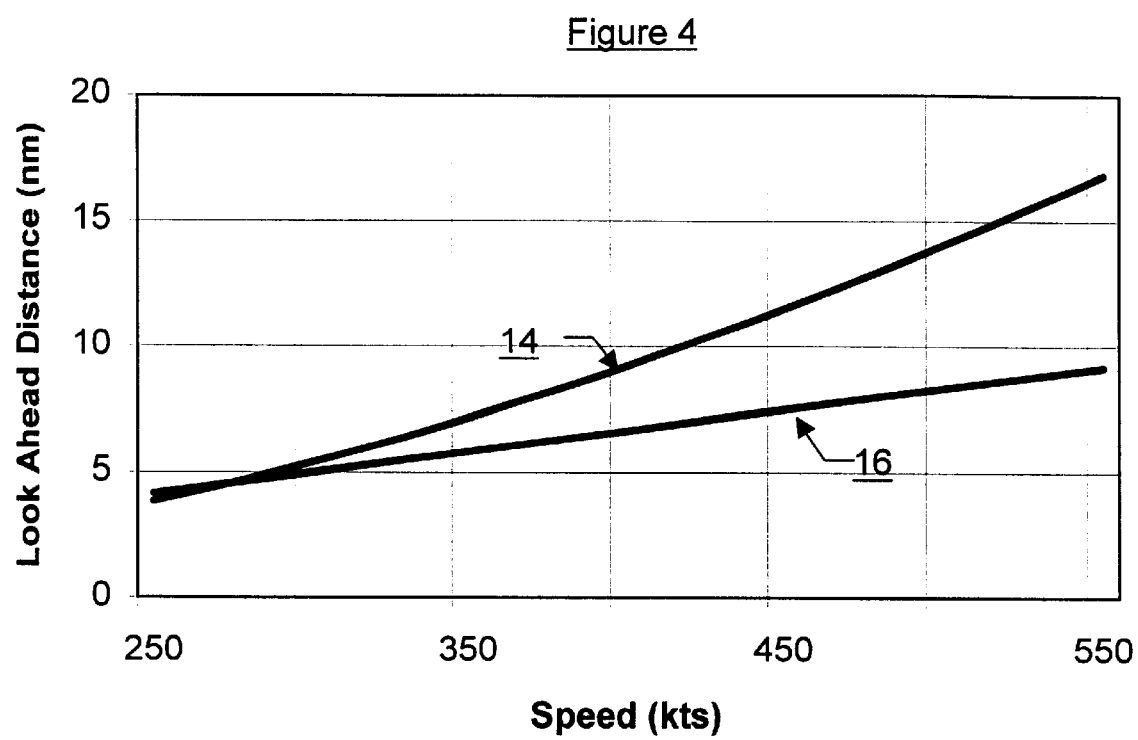

APPARATUS, METHODS, AND COMPUTER PROGRAM PRODUCTS FOR DETERMINING A LOOK AHEAD DISTANCE VALUE FOR HIGH SPEED FLIGHT

RELATED APPLICATIONS

The present application claims priority from U.S. Provisional Application Serial No. 60/118,183 entitled EGPWS WARNING FOR HIGH SPEED FLIGHT, filed Feb. 1, 1999, the contents of which are incorporated herein by reference.

FIELD OF THE INVENTION

The present invention relates generally to ground proximity warning systems for use in aircraft. More particularly, the apparatus, methods, and computer program products of the present invention relate to determining a look ahead distance value for use in a ground proximity warning system that provides a desired reaction time for high speed flight.

BACKGROUND OF THE INVENTION

An important advancement in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions of the aircraft with surrounding terrain or other obstacles.

Although these warning systems are quite useful in providing the flight crew with information concerning potential problems with the navigation of the aircraft, the usefulness of these systems must be balanced against problems associated with the generation of nuisance alarms. Specifically, although it is advantageous to provide the flight crew with as much information as possible concerning terrain and obstacles in the flight path of the aircraft, this information should be delivered to the flight crew in a timely manner, such that the flight crew will pay close attention to these alarms. If alarms are provided too far in advance to the flight crew concerning terrain that is still far away from the present position of the aircraft, the flight crew may become desensitized to the alarms and may potentially ignore alarms from the ground proximity warning system altogether. Further, the generation of alarms concerning terrain that is still far away from the present position of the aircraft may also add stress and confusion on the flight crew and may overshadow other more critical alarms in the cockpit.

For this reason, at least one ground proximity warning system includes techniques that limit the number of potential nuisance alarms generated. This ground proximity warning system uses a look ahead distance value that defines a distance surrounding the aircraft in which the ground proximity warning system will provide alarms to the flight crew concerning potential ground proximity danger. This look ahead distance is further divided into advisory and warning regions, such that advisory alarms are generated for potential problems with terrain located at the outer extremities of the look ahead distance, while warning alarms are provided for problems with terrain located nearer the current position of the aircraft.

The look ahead distance value used by this ground proximity warning system is typically based on the flight parameters and flight characteristics of the aircraft. For example, the look ahead distance value may be based on the ground speed of the aircraft, actual roll angle of the aircraft, and/or a characteristic turning radius associated with the type of aircraft. The look ahead distance value may also be based on the proximity of the aircraft to a selected runway. Specifically, as an aircraft approaches a runway for landing, the look ahead distance value is typically decreased to reduce the number of nuisance alarms and focus on potential problems within the immediate surroundings of the aircraft.

In addition, the look ahead distance value is typically limited to minimum and maximum values. A minimum look ahead distance value is typically chosen to provide a minimum reaction time, while a maximum look ahead distance value is typically chosen to reduce the number of nuisance alarms generated.

As an example, one of the look ahead distance values typically used by the ground proximity warning system is based on the speed of the aircraft and a characteristic turning radius associated with the aircraft. This look ahead distance value is referred to as the ground speed look ahead distance value and typically provides a look ahead distance value based on the speed of the aircraft and the reaction time required for the aircraft to perform two turning radii plus an added reaction time. The equation for the determination of this ground speed look ahead distance is:

$$LAD_{Ground\ Speed} = 0.00278(Vg) + 0.000050568(Vg^2) + K$$

where $LAD$ = ground speed look ahead distance in nm, $Vg$ = ground speed in kts, and $K$ = constant.

The derivation of this equation is discussed in detail in U.S. Pat. No. 5,839,080 to Muller, entitled "Terrain Awareness System" which is assigned to the assignee of the present application. The derivation of this equation is also provided later below.

FIG. 1 depicts this equation graphically in terms of look ahead distance versus ground speed. As can be seen, for aircraft speeds in the range of 100 kts to 250 kts, the look ahead distance value varies with ground speed. For aircraft speeds below 100 kts, the ground proximity warning system limits the look ahead distance value to 0.75 nm. This lower limit is used to ensure that a proper minimum look ahead distance is maintained. The ground proximity warning system also limits the look ahead distance by an upper limit of 4 nm for speeds exceeding 250 kts. The upper limit of the look ahead distance value is provided to reduce the number of nuisance alarms generated.

Although limiting the distance surrounding the aircraft in which ground proximity warning alarms are generated is advantageous as it reduces nuisance alarms, there may be some drawbacks. Specifically, if the aircraft is traveling at a high rate of speed, of for example in excess of 250 knots, the limited look ahead distance may not provide desired reaction times for the aircraft to perform an evasive maneuver. For example, FIG. 2 illustrates a plot 2 of the reaction time as a function of aircraft speed and look ahead distance. Specifically, the plot depicts the reaction time provided by the look ahead distance for the given speed of the aircraft, i.e., Reaction Time=LAD/Speed.

As illustrated in FIG. 2, for aircraft speeds in the range of 100 kts to 250 kts, the reaction time increases, however, above 250 kts, where the look ahead distance is limited to 4 nm, the reaction time begins to decrease, shown by decreasing portion 4 of plot 2. For example, at 250 kts, the look ahead distance value provides a reaction time of approximately 55.5 seconds. However, at 360 kts, the reaction time has been reduced to 40 seconds. Thus, while the above approach provides a mechanism for reducing the number of nuisance alarms provided to the flight crew, with increased aircraft speeds, the reaction time may be reduced to a point where it is more desirable to provide at least some minimum reaction time.

One solution to the problem of reduced reaction time for increased aircraft speeds could be to increase the maximum limit of the look ahead distance value to a value greater than the current 4 nm maximum limit. This would allow for increased look ahead distance values at higher aircraft speeds. However, as illustrated in the above equation, the look ahead distance value is a function of the square of the speed of the aircraft. Thus, for small increases in aircraft speed, the look ahead distance value will increase significantly. As such, increasing the maximum look ahead distance limit above the current 4 nm maximum limit may undesirably increase the number of nuisance alarms.

In light of this, it would be desirable to have a ground proximity warning system that generates a look ahead distance that provides a desired minimum reaction time when the aircraft is traveling at higher speeds, while at the same time reducing the number of nuisance alarms generated.

SUMMARY OF THE INVENTION

As set forth below, the apparatus, methods, and computer program products of the present invention overcome many of the deficiencies identified with using a limited look ahead distance value for high speed flight. The present invention provides several apparatus, methods, and computer program products for determining a look ahead distance value for use in a ground proximity warning system. Specifically, the apparatus, methods, and computer program products of the present invention generate a candidate look ahead distance value that provides a constant reaction time for varying aircraft speeds. This constant reaction time look ahead distance value is compared to other candidate look ahead distance values that have variable reaction times for varying aircraft speeds. If the aircraft is traveling at a relatively high speed, the apparatus, methods, and computer program products of the present invention select the constant reaction time look ahead distance value for use in the ground proximity warning system.

Importantly, because the apparatus, methods, and computer program products of the present invention switch from a variable reaction time look ahead distance value to a constant reaction time look ahead distance value when the aircraft is travelling at higher speeds, the present invention can provide a look ahead distance value that reduces nuisance alarms for lower speeds, while also providing desired reaction times for higher speeds. Additionally, the constant reaction time look ahead distance value is selected such that it provides desired reaction times, while at the same time not necessarily enlarging the look ahead distance value to reduce the number of nuisance alarms at higher speeds.

These and other advantages are provided by an apparatus and method for computing a candidate look ahead distance value for use in a ground proximity warning system. The apparatus of this embodiment includes a processor that generates a constant reaction time look ahead distance value based on a selected constant reaction time and the speed of an aircraft. In operation, the processor receives a selected reaction time value representing a desired reaction time. The processor multiplies the selected reaction time value by the speed of the aircraft. This generates a constant reaction time look ahead distance value that provides the desired reaction time for evasive maneuvers at the current speed of the aircraft.

As discussed, the processor of the present invention multiplies the speed of the aircraft by a desired reaction time. In one embodiment, a reaction time of sixty seconds is desired for evasive maneuvers at high speeds. In this embodiment of the present invention, the processor generates the constant reaction time look ahead distance value by multiplying the speed of the aircraft by sixty seconds.

The present invention also provides apparatus and methods for determining, from a plurality of candidate look ahead distance values, a look ahead distance value for use in a ground proximity warning system. In this embodiment, the processor selects a look ahead distance value representing a distance extending about an aircraft within which the ground proximity warning system provides ground proximity alerts. Importantly, in this embodiment, one of the candidate look ahead distance values is a constant reaction time look ahead distance value that varies as the speed of the aircraft varies to provide a constant reaction time.

In one embodiment, at least one of the other candidate look ahead distance values is a variable reaction time look ahead distance value. The variable reaction time look ahead distance value varies as the ground speed of the aircraft varies and provides a variable reaction time. In this embodiment of the present invention, the processor selects one of the candidate look ahead distance values based on a mathematical relationship between the plurality of candidate look ahead distance values. For instance, in one embodiment, the processor selects the smaller of the candidate look ahead distance values as the look ahead distance value for use in the ground proximity warning system.

Importantly, in one embodiment, the constant reaction time look ahead distance value provides a desired reaction time for aircraft speeds that exceed a predetermined threshold speed. In this embodiment, if the aircraft speed is at least as great as the predetermined threshold speed, the processor selects the constant reaction time look ahead distance value as the look ahead distance value for use in the ground proximity warning system. Additionally, in one embodiment, if the selected look ahead distance value exceeds a predetermined maximum look ahead distance value, the processor limits the look ahead distance value to the value of the predetermined maximum look ahead distance value.

As discussed above, in one embodiment, at least one of the candidate look ahead distance values is a variable reaction time look ahead distance value. Depending on the embodiment, the variable reaction time look ahead distance value may be a distance to runway look ahead distance value, a ground speed look ahead distance value, and/or a roll angle look ahead distance value.

The present invention also provides computer program products for determining a look ahead distance value for use in a ground proximity warning system. The computer program products include a computer readable storage medium having computer readable program code means embodied in the medium. The computer-readable program code means includes first computer instruction means for selecting from a plurality of candidate look ahead distance values, a look ahead distance value representing a distance extending about an aircraft within which the ground proximity warning system provides ground proximity alerts. Importantly, one of the candidate look ahead distance values is a constant reaction time look ahead distance value that varies as the speed of the aircraft varies to provide a constant reaction time.

In one embodiment, at least one of the candidate look ahead distance values is a variable reaction time look ahead distance value. This variable reaction time look ahead distance value that varies as the ground speed of the aircraft varies and provides a variable reaction time. In this embodiment, the first computer instruction means comprises means for selecting one of the candidate look ahead distance values based on a mathematical relationship between the plurality of candidate look ahead distance values. For example, in one embodiment, the first computer instruction means comprises means for selecting the smaller of the candidate look ahead distance values as the look ahead distance value for use in the ground proximity warning system.

In a further embodiment, the computer-readable program code means further includes second computer instruction means for generating the constant reaction time look ahead distance value. In operation the second computer instruction means multiples the speed of the aircraft by a selected constant reaction time to generate the constant reaction time look ahead distance value.

In another embodiment, the computer readable program code means may further include third computer instruction means for comparing the selected look ahead distance value to a predetermined maximum look ahead distance value and fourth computer instruction means for limiting the look ahead distance value to the value of the predetermined maximum look ahead distance value, if the selected look ahead distance value exceeds the predetermined maximum look ahead distance value.

BRIEF DESCRIPTION OF THE DRAWINGS

FIGS. 3A and 3B are graphic illustrations of the relationship between the reaction time of the aircraft and the speed of the aircraft based on the constant reaction time look ahead distance value according to one embodiment of the present invention.

FIG. 4 is a graphic illustration depicting the differences between the ground speed look ahead distance and the constant reaction time look ahead distance values according to one embodiment of the present invention.

DETAILED DESCRIPTION OF THE INVENTION

Figure 1:
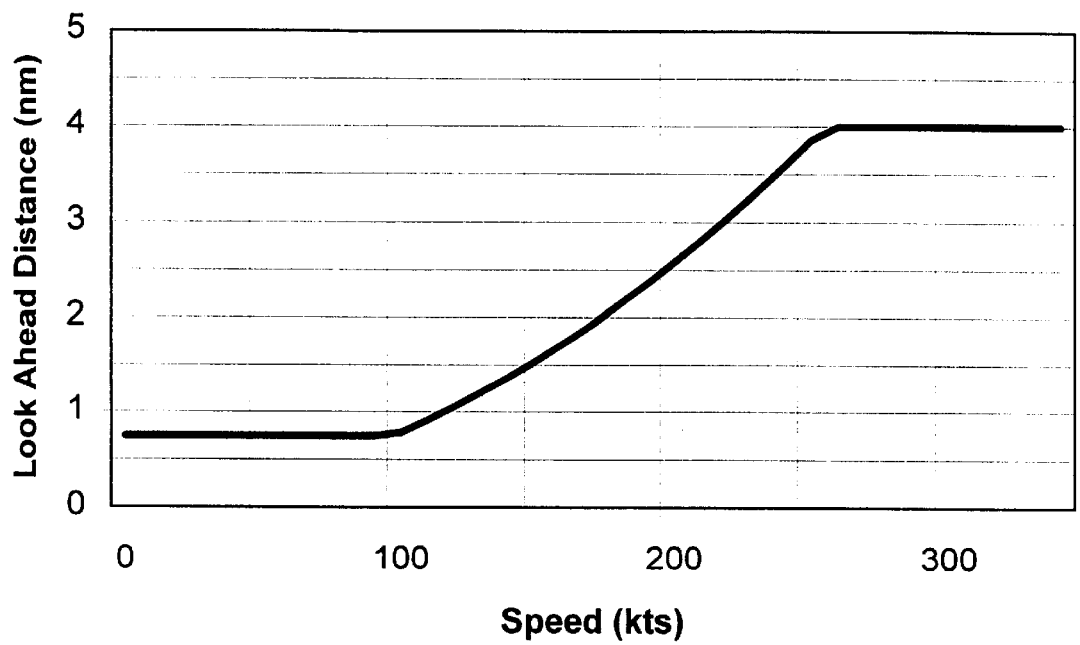
FIG. 1 is a graphic illustration of the relationship between the ground speed look ahead distance value and the speed of an aircraft.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, the present invention provides apparatus, methods, and computer program products for determining a look ahead distance value for use in a ground proximity warning system. Importantly, the apparatus, methods, and computer program products of the present invention generate a candidate look ahead distance value that provides a constant reaction time for varying aircraft speeds. This constant reaction time look ahead distance value is compared to other candidate look ahead distance values that have variable reaction times for varying aircraft speeds. If the aircraft is traveling at a relatively high speed, the apparatus, methods, and computer program products of the present invention selects the constant reaction time look ahead distance value for use in the ground proximity warning system. Because the apparatus, methods, and computer program products of the present invention switch from a variable reaction time look ahead distance value to a constant reaction time look ahead distance value when the aircraft is travelling at higher speeds, the present invention can provide a look ahead distance value that reduces nuisance alarms for lower speeds, while also providing at least some minimum reaction time for higher speeds. Additionally, the constant reaction time look ahead distance value is selected such that it provides desired reaction times, while at the same time not necessarily enlarging the look ahead distance value to reduce the number of nuisance alarms at higher speeds.

Some of the advantages of the present invention are illustrated with reference to FIGS. 3A and 3B. With reference to FIG. 3A, it must first be noted that FIG. 3A illustrates the plot of aircraft speed versus reaction time as originally depicted in FIG. 2. However, in FIG. 3A, the present invention limits the look ahead distance value to a maximum limit of 8 nm, as opposed to 4 nm. Specifically, plot 6 of FIG. 3A is the same as plot 2 of FIG. 2, except that the upper limit is now 8 nm. The apparatus, methods, and computer program products of the present invention typically use an 8 nm limit, as opposed to a 4 nm, to allow for increased reaction times. Increasing the maximum limit of the ground speed look ahead distance value to 8 nm allows the processor to select the constant reaction time look ahead distance value, which may exceed the original 4 nm limit, when the aircraft is traveling at higher speeds. However, as discussed below, because the constant reaction time look ahead distance typically represents a value that is less than the ground speed look ahead distance value for higher aircraft speeds, the number of nuisance alarms is not necessarily enlarged. (See discussion accompany FIG. 4).

With reference to FIG. 3A, aircraft speed, look ahead distance, and reaction time are determined mathematically by the following equation:

$$LAD = Speed * Time$$

or $$Reaction\ Time = LAD/Speed.$$

As such, when the look ahead distance value is limited to a maximum value, for increasing aircraft speeds, the reaction time will decrease. This is illustrated graphically in FIG. 3A, by the decreasing portion 8 of plot 6.

The present invention remedies some of the problems associated with determining a look ahead distance value for increased aircraft speeds by providing a constant reaction time look ahead distance value. With reference to FIGS. 3A and 3B, the present invention provides a constant reaction time look ahead distance value that corresponds to a constant reaction time for increasing aircraft speeds, shown as plot 10. When the speed of the aircraft reaches a point where, for increased speeds, the variable reaction time look ahead distance value provides an undesirably large look ahead distance value, (see point 12), the present invention selects a constant reaction time look ahead distance value, as opposed to a variable reaction time look ahead distance value for ground proximity warning calculations.

By selecting the constant reaction time look ahead distance value for higher speeds of the aircraft, the apparatus, methods, and computer program products of the present invention can provide a minimum reaction time, while at the same time not necessarily enlarging the look ahead distance value to reduce the number of nuisance alarms at higher speeds. Specifically, FIG. 4 illustrates graphically both the ground speed look ahead distance value 14 and the constant reaction time look ahead distance value 16 of the present invention versus aircraft speed. As can be seen, the constant reaction look ahead distance value of the present invention provides a desired reaction time for high speed flight, while at the same time providing a reduced look ahead distance value to decrease nuisance alarms.

For example, at an aircraft speed of 400 kts, the ground speed look ahead distance value would be 9.2 nm, while the constant reaction time look ahead distance value would be 6.67 nm. In this instance, the apparatus, methods, and computer program products of the present invention would select the constant reaction time look ahead distance value, which provides a minimum reaction time of 60 seconds while also not necessarily enlarging the look ahead distance.

For illustrative purposes, the various apparatus, methods, and computer program products of the present invention are illustrated and described below in conjunction with the ground proximity warning system of U.S. Pat. No. 5,839,080 to Muller, entitled "Terrain Awareness System" which is assigned to the assignee of the present application. The contents of U.S. Pat. No. 5,839,080 are incorporated herein by reference.

Figure 5:
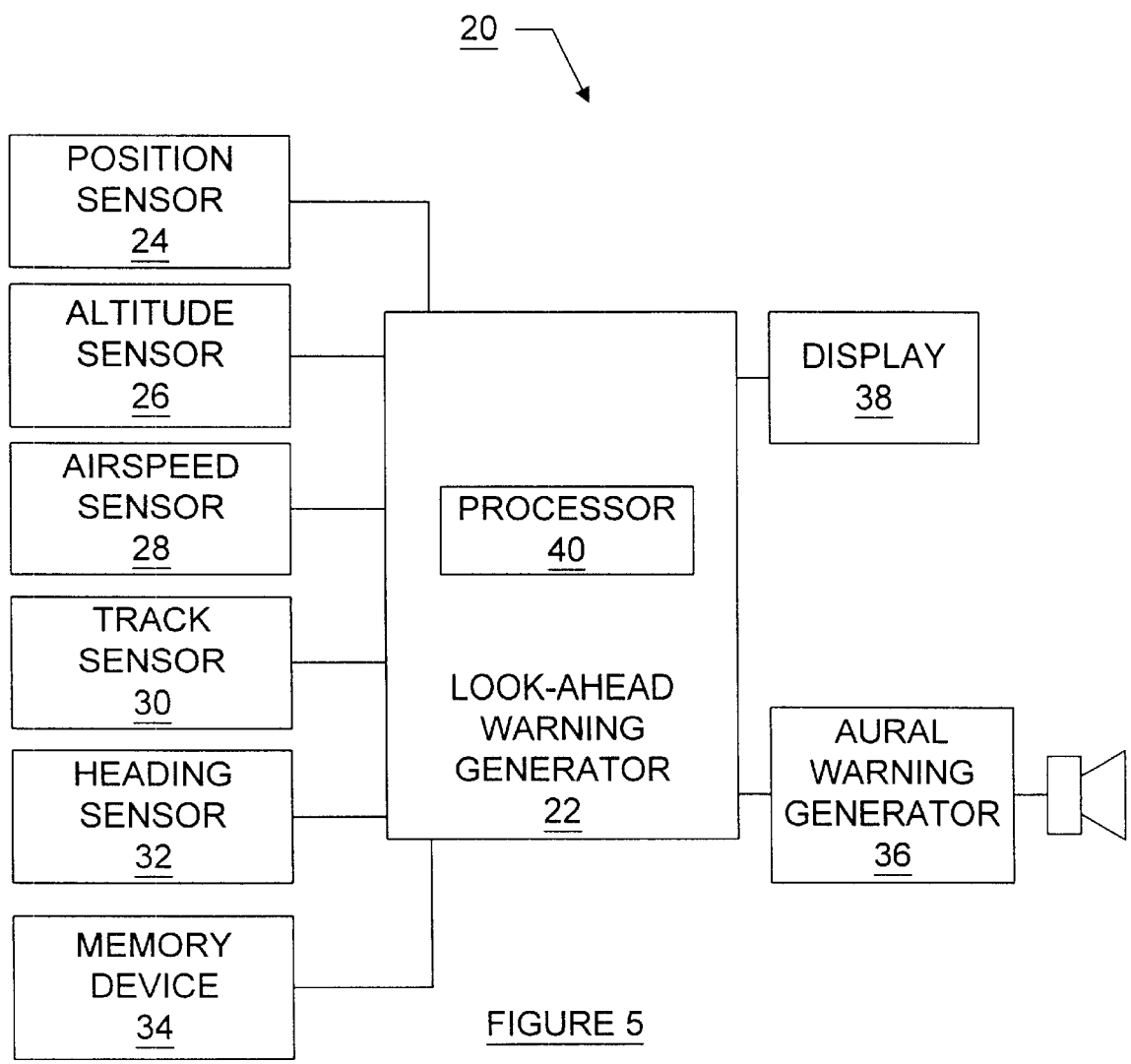
FIG. 5 is a block diagram of an apparatus for determining a corrected distance between an aircraft and selected runway according to one embodiment of the present invention.

FIG. 5 depicts many of the components of the ground proximity warning system of U.S. Pat. No. 5,839,080 in simplified block form for illustrative purposes, however, it is understood that the functions of these blocks are consistent with and contain many of the same components as the ground proximity warning system described in U.S. Pat. No. 5,839,080. The ground proximity warning system 20 includes a look-ahead warning generator 22 that analyzes terrain and aircraft data and generates terrain profiles surrounding the aircraft. Based on these terrain profiles and the position, track, and ground speed of the aircraft, the look-ahead warning generator generates aural and/or visual warning alarms related to the proximity of the aircraft to the surrounding terrain. Some of the sensors that provide the look-ahead warning generator with data input concerning the aircraft are depicted. Specifically, the look-ahead warning generator receives positional data from a position sensor 24. The position sensor may be a portion of a global positioning system (GPS), inertial navigation system (INS), or flight management system (FMS). The look-ahead warning generator also receives altitude and airspeed data from an altitude sensor 26 and airspeed sensor 28, respectively, and aircraft track and heading information from track 30 and heading 32 sensors, respectively.

In addition to receiving data concerning the aircraft, the look-ahead warning system also receives data concerning the terrain surrounding the aircraft. Specifically, the look-ahead warning generator is also connected to a memory device 34 that contains a searchable data base of data relating, among other things, to the position and elevation of various terrain features and also elevation, position, and quality information concerning runways.

In normal operation, the look-ahead warning generator receives data concerning the aircraft from the various sensors. Additionally, the look-ahead warning generator accesses terrain and airport information from the memory device concerning the terrain surrounding the aircraft and a selected runway-typically the runway that is closest in proximity to the aircraft's current position or a determined runway. Based on the current position, distance to the selected runway, altitude above the selected runway, speed, track, etc. of the aircraft, the look-ahead warning generator generates terrain advisory and warning envelopes and generates alerts via either an aural warning generator 36 and/or a display 38 as to terrain or other obstacles that penetrate the terrain advisory and warning envelopes. In addition, the look-ahead warning generator generates a terrain clearance floor and produces alerts if the aircraft falls below the terrain clearance floor, such as during landing.

As discussed above, the present invention provides apparatus, methods, and computer program products for determining a look ahead distance value for use in a ground proximity warning system. As such, with reference to FIG. 5, an apparatus for determining a look ahead distance value is illustrated. In one embodiment of the present invention, the apparatus includes a processor 40 associated with the look-ahead warning generator. The processor may either be part of the processor of the look-ahead warning generator or it may be a separate processor located either internal or external to the look-ahead warning generator.

Figure 6:
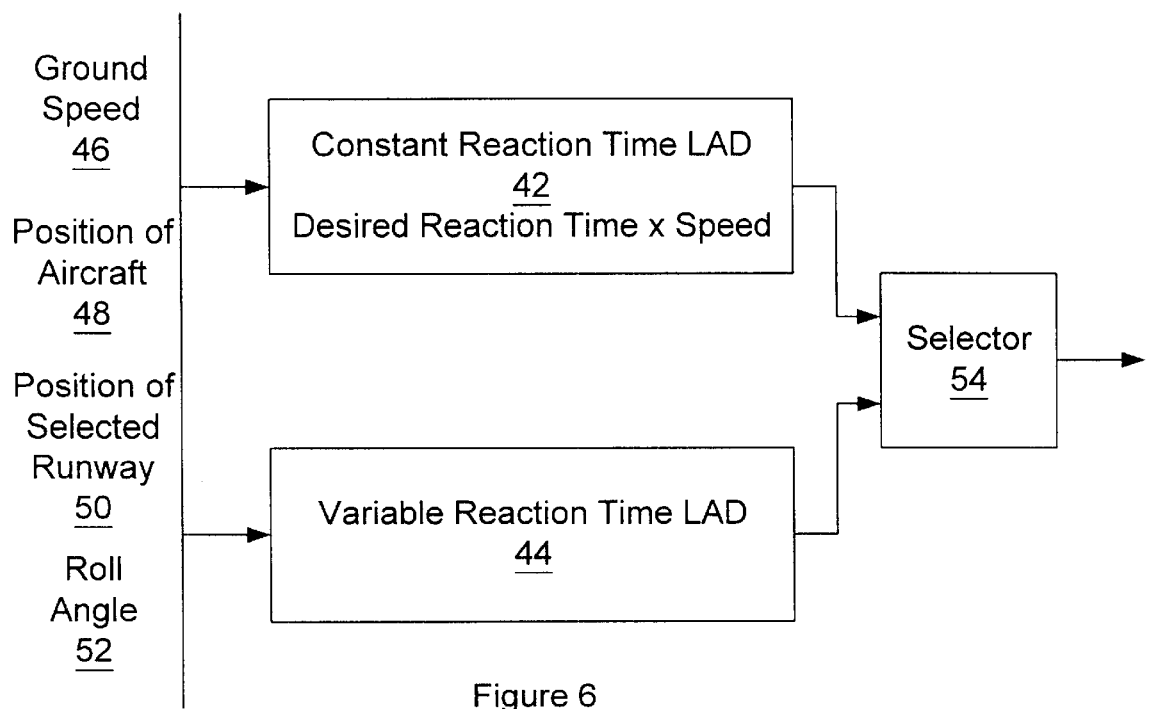
FIG. 6 is a block diagram of the operations performed to determine a look ahead distance value according to one embodiment of the present invention.
Figure 7:
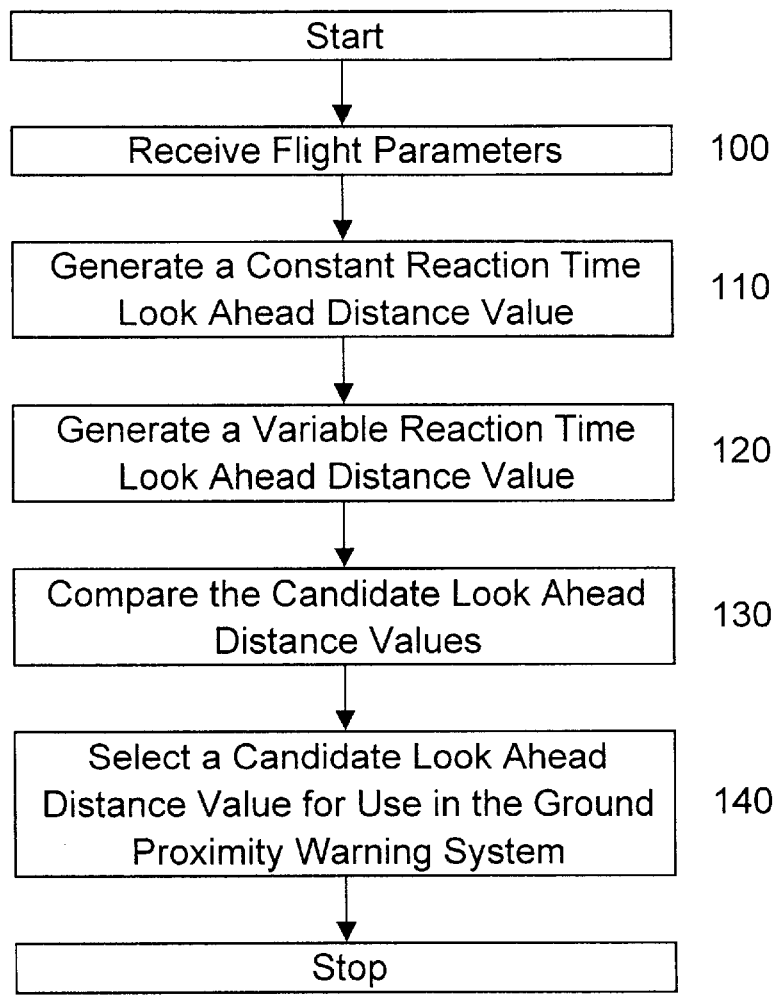
FIG. 7 is also a block diagram of the operations performed to determine a look ahead distance value according to one embodiment of the present invention.

With reference to FIGS. 5, 6, and 7, the determination of a look ahead distance value for use in a ground proximity warning system is illustrated. Specifically, FIG. 6 depicts the operations of the present invention in block diagram form, while FIG. 7 is an operational flow diagram. To determine a look ahead distance value for use in a ground proximity warning system, the processor selects from a plurality of candidate look ahead distance values, where one of the candidate look ahead distance values is a constant reaction time look ahead distance value. With reference to FIG. 6, the processor of one embodiment of the present invention determines at least two separate candidate look ahead distance values: 1) a constant reaction time look ahead distance value that varies with aircraft speed 42, and 2) a varying reaction time look ahead distance value that has a varying reaction time with varying aircraft speeds 44. The varying reaction time look ahead distance value may be either: 1) a look ahead distance based on distance to runway, 2) a ground speed look ahead distance, and/or 3) a roll angle look ahead distance.

Specifically, with reference to FIGS. 5, 6, and 7, the processor receives information concerning various flight parameters of the aircraft. (See step 100). For instance, the processor may receive the speed of the aircraft 46 from the airspeed sensor 26, position of the aircraft 48 from the position sensor 24, position concerning a selected runway 50 from the memory device 34, and the roll angle 52 of the aircraft. Using these flight parameters, the processor generates both the constant reaction time look ahead distance value 42 and at least one of the varying reaction time look ahead distance values 44. (See steps 110 and 120). The processor next compares the candidate look ahead distance values via a selector 54, (see step 130), and selects one of the candidate look ahead distance values for use in the ground proximity warning system. (See step 140).

Depending on the embodiment, the candidate look ahead distance value may be selected in many different ways. For instance, in one embodiment, the look ahead distance value is based on a mathematical relationship between the candidate look ahead distance values. Specifically, in one embodiment, the processor selects the smallest of the candidate look ahead distance values for use in the ground proximity warning system.

Figure 8:
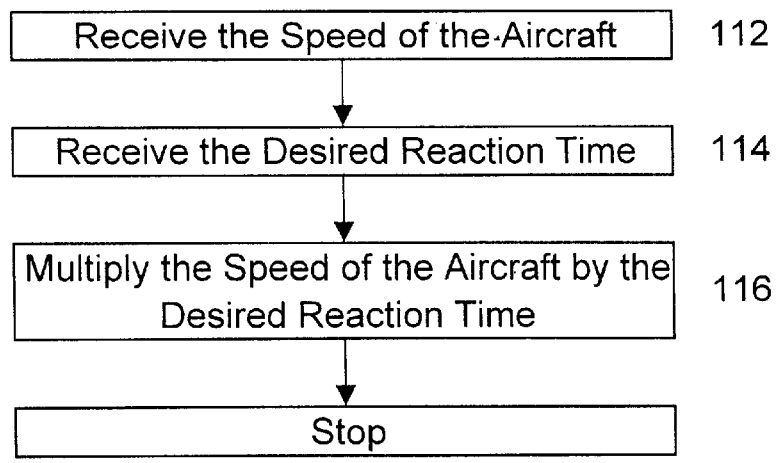
FIG. 8 is a block diagram of the operations performed to determine a constant reaction time look ahead distance value according to one embodiment of the present invention.

As also discussed above, the processor of the present invention determines a constant reaction time look ahead distance value. (See step 110). In one embodiment of the present invention, the processor determines the constant reaction time look ahead distance value based on the speed of the aircraft and a desired reaction time. Specifically, with reference to FIG. 8, in this embodiment, the processor receives the speed of the aircraft from the airspeed sensor 26. (See step 112). The processor also receives the desired reaction time, which is typically stored in the memory device 34. (See step 114). The processor multiplies the desired reaction time by the speed of the aircraft to determine the constant reaction time look ahead distance value. (See step 116).

In one embodiment, the desired reaction time is chosen as 60 seconds. In this embodiment of the present invention, the processor multiplies the speed of the aircraft by 60 seconds to determine the constant reaction time look ahead value. As an example, if the speed of the aircraft is 200 kts, the processor determines the constant reaction time look ahead distance value as follows:

$$LAD_{Const.React.} = \text{Desired Reaction Time} \times \text{Aircraft Speed}$$
$$= 60 \text{ sec} \times 200 \text{ nm/hr}$$
$$= 60 \text{ sec} \times (1 \text{ hr}/3600 \text{ sec}) \times 200 \text{ nm/h}$$
$$= 3.33 \text{ nm}.$$

As such, if the aircraft is traveling at 200 kts, the constant reaction look ahead distance value for a desired reaction time of 60 seconds is 3.33 nm.

As discussed, the constant reaction time look ahead distance value is determined based on a desired reaction time. It must be understood that the desired reaction time may be any selected time interval and is typically based on the flight characteristics of the aircraft, such as the recommended turning radius of the aircraft.

Figure 9:
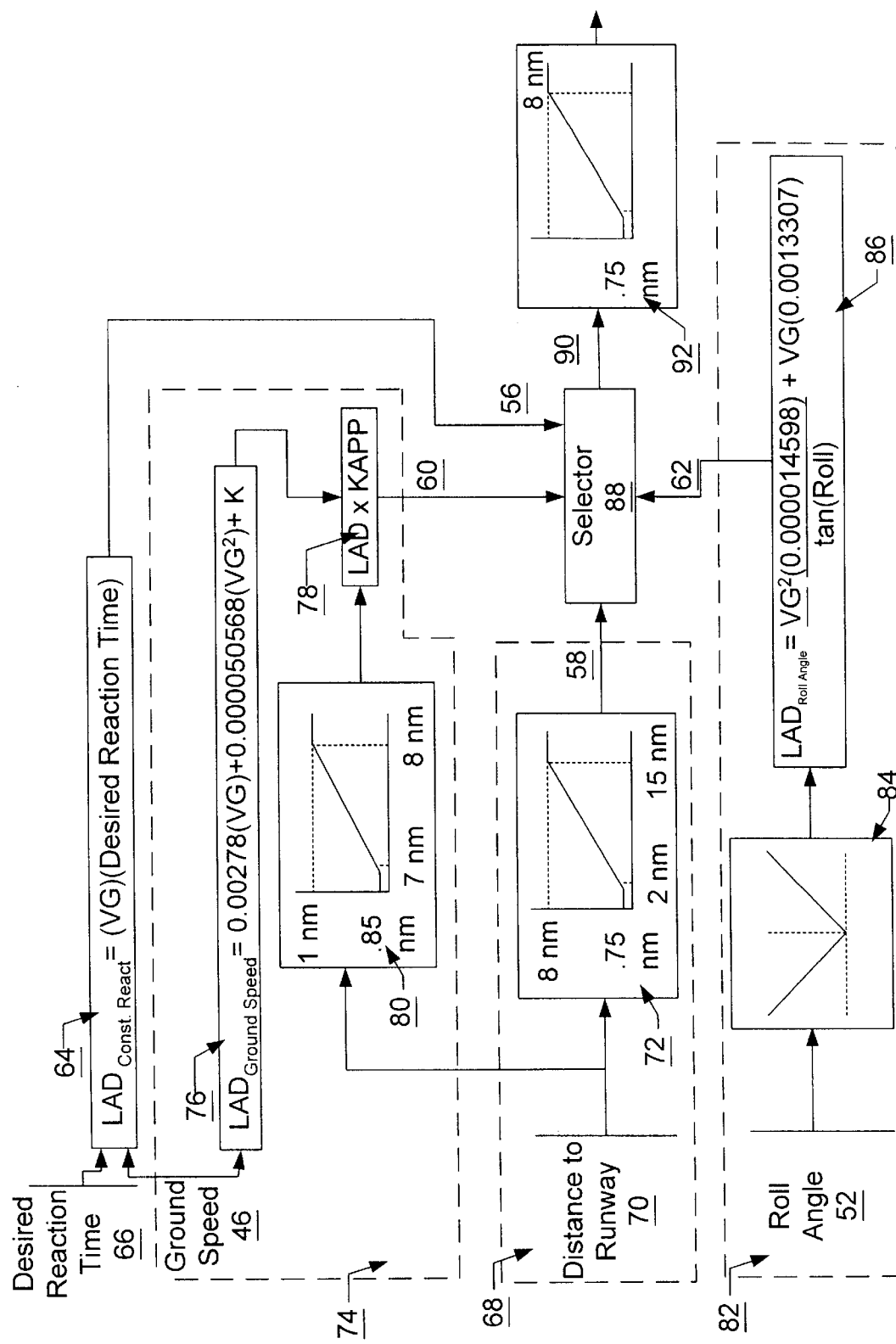
FIG. 9 is a block diagram of the operations performed to determine a look ahead distance value according to another embodiment of the present invention.
Figure 10:
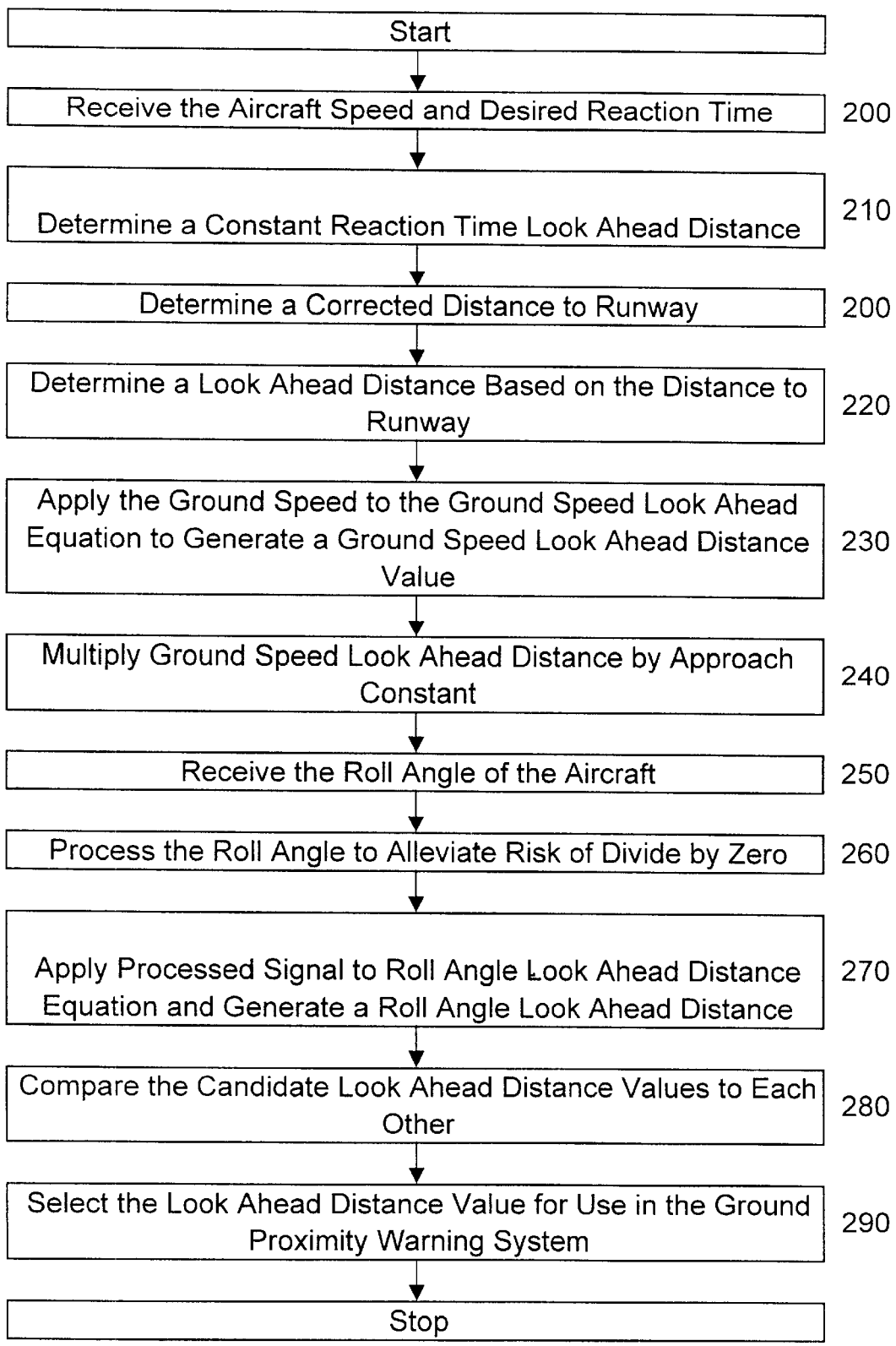
FIG. 10 is also a block diagram of the operations performed to determine a look ahead distance value according to the embodiment of the FIG. 9.

To provide a more complete understanding of the present invention, provided below is an example of the use of the present invention with the ground proximity warning system of U.S. Pat. No. 5,839,080 to Muller. Specifically with reference to FIGS. 9 and 10, the determination of the look ahead distance value is shown. FIG. 9 depicts the operations of the present invention in block diagram form, while FIG. 10 is an operational flow diagram. It must be understood that the various steps and/or elements shown in FIGS. 9 and 10 may be performed by the processor or by discrete components communicably connected to the processor. It must also be understood that the determination of the candidate look ahead distance values may be performed in any order by the processor or simultaneously by the processor.

In this embodiment of the present invention, the processor determines one constant reaction time look ahead distance value 56 and three separate variable reaction time look ahead distance values. The variable reaction time look ahead distance values are: 1) look ahead distance based on distance to runway 58, 2) ground speed look ahead distance value 60, and 3) the roll angle look ahead distance value 62. The ground proximity warning system typically calculates each of the above look ahead distance values and selects the smallest of these values as the look ahead distance value for ground proximity warning calculations.

In particular, using the operations shown in FIG. 9, (see block 64), the processor initially determines a constant reaction time look ahead distance value. With reference to FIG. 10, the processor initially receives the speed of the aircraft 46 from the airspeed sensor 28, shown in FIG. 5, and the desired reaction time 66 from the memory device 34, shown in FIG. 5. (See step 200). The processor next multiplies the speed of the aircraft by the desired reaction time, via the multiplier 64. (See step 210). In this embodiment, the desired reaction time is 60 seconds. This generates the constant reaction time look ahead distance value 56.

With reference to the operations shown in FIG. 9, (see block 68), the processor also determines a look ahead distance value based on the distance 70 to a selected runway. Specifically, with reference to FIGS. 9 and 10, the processor first receives a distance value representing either a coordinate distance or a corrected distance between the aircraft and a selected runway 70. This distance is then applied to the equation 72. This equation provides a look ahead distance as a function of distance between an aircraft and selected runway. Based on this equation, the processor determines a look ahead distance 58. (See step 220). Specifically, the distance between the aircraft and selected runway is applied to the equation:

$$LAD_{Dist.to.Runway}=(7.25/13)(\text{Distance to Runway})-0.365,$$

for look ahead distance (LAD) values between 0.75 nm$\leq$LAD$\leq$8 nm corresponding to distances between the aircraft and runway of 2 nm to 15 nm. As can be seen from this equation, for distance values between 2 nm to 15 nm, the look ahead distance value is in the range of 0.75 nm to 8 nm. For distance values less than 2 nm, the look ahead distance is 0.75 nm, and for distance values greater than 15 nm, the look ahead distance is 8 nm. The derivation of this equation is discussed later below.

It must be noted that, in the conventional ground proximity warning system, the look ahead distance value based on distance to runway was typically limited to an upper limit of $LAD_{Dist.to.Runway}$=4 nm. However, in the present invention the look ahead distance value has been increased to an upper limit of 8 nm.

It must also be noted that the distance to runway value 70 used for determination of the ground speed look ahead distance value may be a coordinate distance between the aircraft and selected runway or it may be a corrected distance value that is calculated as described in U.S. patent Application Serial No. ??/???,??? entitled: "Methods, Apparatus And Computer Program Products For Determining A Corrected Distance Between An Aircraft And A Selected Runway." Additionally, the runway selected from the ground proximity warning calculations may be either the runway closest to the current position of the aircraft or it may be a runway determined by a runway prediction method as described in U.S. patent application Serial No. ??/???,??? entitled: "Methods, Apparatus And Computer Program Products For Automated Runway Selection." Both of these patent applications are assigned to the assignee of the present application and are incorporated herein by reference.

In addition to calculating a look ahead distance based on the distance between the aircraft and selected runway, the processor also determines a ground speed look ahead distance value 60. The ground speed look ahead distance value is based on a look ahead time for a turning radius based on the ground speed of the aircraft and the banking and turning radius of the aircraft. For example, in one embodiment, the ground speed look ahead distance is based on two turning radii of the aircraft at a bank angle of 30° with an added 10 seconds of reaction time. In this embodiment, the ground speed look ahead distance value is defined by the following equation:

$$LAD_{Ground\ Speed} = 0.00278(Vg) + 0.000050568(Vg^2) + K$$

where
LAD=ground speed look ahead distance in nm,
Vg=ground speed in kts, and
K=constant.

The derivation of this equation is discussed in detail in U.S. Pat. No. 5,839,080 to Muller and is also provided later below.

With reference to the operations shown in FIG. 9, (see block 74), and FIG. 10, to determine the ground speed look ahead distance value, the processor receives the speed 46 of the aircraft from the airspeed sensor 28, shown in FIG. 5. The processor applies the ground speed to the ground speed look ahead distance equation 76 and calculates a ground speed look ahead distance value. (See step 230).

The ground speed look ahead distance is next multiplied by an approach constant $K_{APP}$ 78 to generate a ground speed look ahead distance value 60. (See step 240). The approach constant $K_{APP}$ is based on the distance between the aircraft and selected runway. Specifically, the distance value 70 is applied to a determiner 80. The determiner compares the distance to an equation relating distance to runway to an approach constant. For example, in one embodiment, for distance values between 7 nm and 8 nm, the approach constant $K_{APP}$ ranges from 0.85 nm to 1 nm. For distance values less than 7 nm, the approach constant $K_{APP}$ is 0.85 nm, and for distance values greater than 8 nm, the approach constant $K_{APP}$ is 1 nm.

Figure 2:
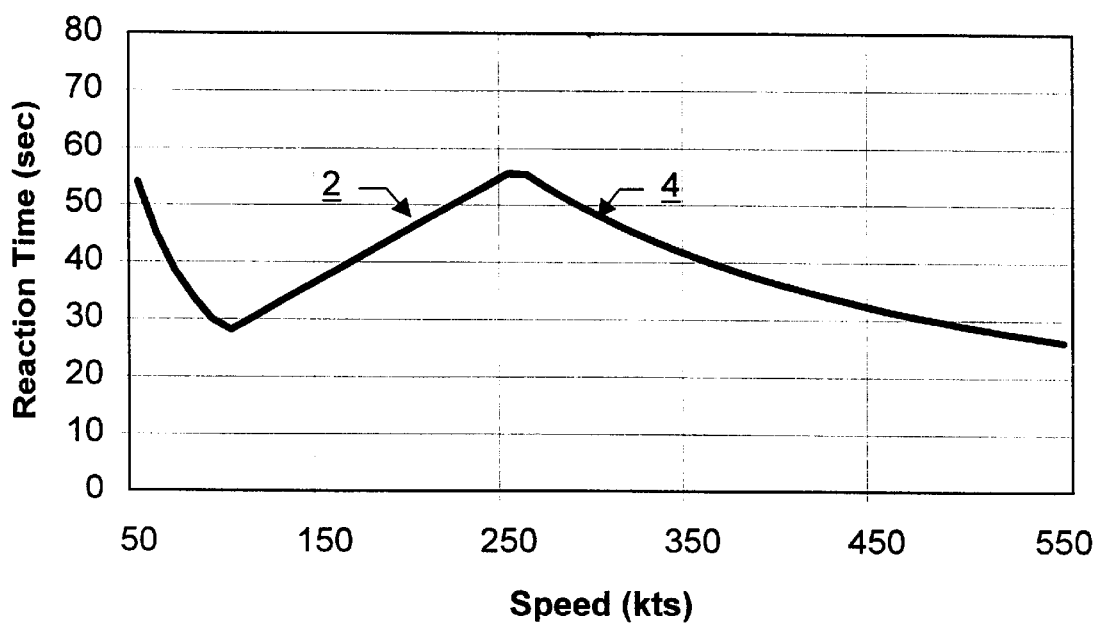
FIG. 2 is a graphic illustration of the relationship between the reaction time of the aircraft and the speed of the aircraft based on the ground speed look ahead distance value.

Importantly, as discussed previously, in conventional ground proximity warning systems, the ground speed look ahead distance value was typically limited by upper and lower limits based on the speed of the aircraft. Specifically, as illustrated in FIG. 2, the ground speed look ahead distance value was limited to a lower limit of 0.75 nm and an upper limit of 4 nm for ground speeds exceeding 250 kts. Due to the addition of the constant reaction time look ahead distance value, however, the ground speed look ahead distance value is not limited by a maximum limit of 4 nm in the present invention.

In addition to calculating a look ahead distance value based on the distance between the aircraft and selected runway and a look ahead distance based on ground speed, the processor also determines a look ahead distance value based on the actual roll angle of the aircraft 52. The roll angle look ahead distance value is based on a look ahead time for the actual turning radius of the aircraft and an added reaction delay time. For example, in one embodiment, the roll angle look ahead distance is based on the actual turning radius of the aircraft and an added 5 seconds of reaction time. In this embodiment, the roll angle look ahead distance is determined by the following equation:

$$LAD_{Roll\ Angle} = (Vg^2(0.000014598)/\tan(Roll)) + Vg(0.0013307) + K$$

where
LAD=ground speed look ahead distance in nm,
Vg=ground speed in kts,
K=constant, and
Roll=actual roll angle of the aircraft.

The derivation of this equation is discussed in detail later below.

With reference to the operations shown in FIG. 9, (see block 82), and FIG. 10, to determine the roll angle look ahead distance value, the processor receives the roll angle 52 of the aircraft. (See step 250). The processor first processes the signal by taking the absolute value, (see block 84), of the roll angle. (See step 260). The processed signal is then applied to the roll angle look ahead distance equation 86 to determine the roll angle look ahead distance value. (See step 270).

After the processor has generated the constant reaction time look ahead distance value 56 and the three variable reaction time look ahead distance values, (i.e., look ahead distance values based on the distance to runway 58, ground speed 60, and roll angle 62 of the aircraft), the processor next compares each of the candidate look ahead distance values via a selector 88, (see step 280), and selects a look ahead distance 90 for ground proximity warning calculations. (See step 290). For instance, in one embodiment, the processor selects the smallest of the candidate look ahead distance values for ground proximity warning calculations. The smaller of the look ahead distance values is typically selected to provide the most conservative look ahead distance to thereby reduce instances of nuisance alarms, while at the same time providing at least a minimum distance and/or time in which to alter the flight path of the aircraft.

The selected look ahead distance value 90 may also be applied to a second limiter 92 to limit the look ahead distance value based on the distance between the aircraft and selected runway. For instance, in one embodiment, the look ahead distance value is limited to a maximum of 8 nm. In this embodiment, regardless of whether the constant reaction time look ahead distance value or one of the variable reaction time look ahead distance values is chosen, if the selected look ahead distance value exceeds 8 nm, it is limited to 8 nm. This is illustrated in FIGS. 3A, 3B, and 4. Specifically, with reference to FIG. 4, at approximately 480 kts, (see plot 16), the constant reaction time look ahead distance exceeds 8 nm. With reference to FIG. 9, in this embodiment, the second limiter 92 limits the look ahead distance to 8 nm. This limitation is reflected in a decrease in reaction time as aircraft speed increases. This decrease is illustrated graphically as decreasing portion 94 of the plot 6 in FIG. 3B.

As detailed above, the processor generates a candidate look ahead distance value that provides a constant reaction time for varying aircraft speeds. This constant reaction time look ahead distance value is compared to other candidate look ahead distance values that have variable reaction times for varying aircraft speeds. If the aircraft is traveling at a relatively high speed, the processor selects the constant reaction time look ahead distance value for use in the ground proximity warning system. Because the present invention switches from a variable reaction time look ahead distance value to a constant reaction time look ahead distance value when the aircraft is travelling at higher speeds, the processor can provide a look ahead distance value that reduces nuisance alarms for lower speeds, while also providing desired reaction times for higher speeds. Additionally, the constant reaction time look ahead distance value is selected such that it provides desired reaction times, while at the same time not necessarily enlarging the look ahead distance value to reduce the number of nuisance alarms at higher speeds.

The following example illustrates the advantages of the present invention. Specifically, below illustrates the determination of the look ahead distance value for two aircraft that are 15 nm from a selected runway and have a respective roll angle of 5°, where one aircraft is traveling at a speed of 200 kts, while the second aircraft is traveling at 400 kts.

For the Aircraft at 200 kts:

$$LAD_{Dist.to.Runway} = (7.25/13)(\text{Distance to Runway}) - 0.365,$$

for look ahead distance (LAD) values between 0.75 run≦LAD≦8 nm corresponding to distances between the aircraft and runway of 2 nm to 15 nm.

$$LAD_{Dist.to.Runway} = (7.25/13)(15) - 0.365,$$
$$= 8.00 \text{ nm}$$

$$LAD_{Ground\ Speed} = 0.00278(Vg) + 0.000050568(Vg^2)$$
$$= 0.00278(200) + .000050568(200)^2$$
$$= 2.58 \text{ nm}$$

$$LAD_{Roll\ Angle} = (Vg^2(0.000014598)/\tan(\text{Roll})) + Vg(0.0013307)$$
$$= ((200)^2(0.000014598)/\tan(5°)) + 200(0.0013307)$$
$$= 6.94 \text{ nm}$$

$$LAD_{Const.React.} = \text{Desired Reaction Time} \times \text{Aircraft Speed}$$
$$= 60 \text{ sec} \times (1 \text{ hr}/3600 \text{ sec}) \times 200 \text{ nm/h}$$
$$= 3.33$$

As can be seen with reference to FIG. 3B, in this embodiment, because the aircraft is traveling at a speed below which the ground speed look ahead distance may provide an undesirable look ahead distance value for increased aircraft speed, the present invention will select the ground speed look ahead distance value of 2.58 nm, as it is the smallest of the candidate look ahead distance values.

For the Aircraft at 400 kts:

$$LAD_{Dist.to.Runway} = (7.25/13)(\text{Distance to Runway}) - 0.365,$$

for look ahead distance (LAD) values between 0.75 nm≦LAD <8 nm corresponding to distances between the aircraft and runway of 2 nm to 15 nm.

$$LAD_{Dist.to.Runway} = (7.25/6)(13) - 0.365,$$
$$= 8.00 \text{ nm}$$

$$LAD_{Ground\ Speed} = 0.00278(Vg) + 0.000050568(Vg^2)$$
$$= 0.00278(400) + .000050568(400)^2$$
$$= 9.2 \text{ nm}$$

$$LAD_{Roll\ Angle} = (Vg^2(0.000014598)/\tan(\text{Roll})) + Vg(0.0013307)$$
$$= ((400)^2(0.000014598)/\tan(5°)) + 400(0.0013307)$$
$$= 27.23 \text{ nm}$$

$$LAD_{Const.React.} = \text{Desired Reaction Time} \times \text{Aircraft Speed}$$
$$= 60 \text{ sec} \times (1 \text{ hr}/3600 \text{ sec}) \times 400 \text{ nm/h}$$
$$= 6.67 \text{ nm}.$$

As can be seen with reference to FIG. 3B, in this embodiment, because the aircraft is traveling at a speed above which the ground speed look ahead distance may provide an undesirable look ahead distance value for increased aircraft speed, the present invention will select the constant reaction time look ahead distance value of 6.67 nm, as it is the smallest of the candidate look ahead distance values.

As described above, the various apparatus of the present invention includes a processor. It must be understood that the processor may consist of any number of devices. The processor may be a data processing device, such as a microprocessor or microcontroller or a central processing unit. The processor could be another logic device such as a DMA (Direct Memory Access) processor, an integrated communication processor device, a custom VLSI (Very Large Scale Integration) device or an ASIC (Application Specific Integrated Circuit) device.

In addition to providing apparatus and methods, the present invention also provides computer program products for determining a look ahead distance value for use in a ground proximity warning system. The computer program products have a computer readable storage medium having computer readable program code means embodied in the medium. With reference to FIG. 5, the computer readable storage medium may be part of the memory device 34, and the processor 40 of the present invention may implement the computer readable program code means to determine a look ahead distance value as described in the various embodiments above.

The computer-readable program code means includes first computer instruction means for selecting from a plurality of candidate look ahead distance values, a look ahead distance value representing a distance extending about an aircraft within which the ground proximity warning system provides ground proximity alerts. Importantly, one of the candidate look ahead distance values is a constant reaction time look ahead distance value that varies as the speed of the aircraft varies to provide a constant reaction time.

In one embodiment, at least one of the candidate look ahead distance values is a variable reaction time look ahead distance value. This variable reaction time look ahead distance value that varies as the ground speed of the aircraft varies and provides a variable reaction time. In this embodiment, the first computer instruction means comprises means for selecting one of the candidate look ahead distance values based on a mathematical relationship between the plurality of candidate look ahead distance values. For example, in one embodiment, the first computer instruction means comprises means for selecting the smaller of the candidate look ahead distance values as the look ahead distance value for use in the ground proximity warning system.

In a further embodiment, the computer-readable program code means further includes second computer instruction means for generating the constant reaction time look ahead distance value. In operation the second computer instruction means multiples the speed of the aircraft by a selected constant reaction time to generate the constant reaction time look ahead distance value.

In another embodiment, the computer readable program code means may further include third computer instruction means for comparing the selected look ahead distance value to a predetermined maximum look ahead distance value and fourth computer instruction means for limiting the look ahead distance value to the value of the predetermined maximum look ahead distance value, if the selected look ahead distance value exceeds the predetermined maximum look ahead distance value.

In this regard, FIGS. 5–10 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s). Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

As discussed above, the apparatus, methods and computer program products of the present invention determines three different variable reaction time look ahead distance values: 1) one based on the distance between the aircraft and selected runway 58, 2) one based on the ground speed of the aircraft 60, and 3) one based on the actual roll angle of the aircraft 62. The derivation of the equations for these look ahead distance values is provided below.

The distance to runway look ahead distance value is based on an equation relating distance to a selected runway with look ahead distance values. The equation is as follows:

$$LAD_{Dist.to.Runway}=(7.25/13)(\text{Distance to Runway})-0.365,$$

for look ahead distance (LAD) values between 0.75 nm $\leq$ LAD $\leq$ 8 nm corresponding to distances between the aircraft and runway of 2 nm to 15 nm. As can be seen from this equation, for distance values between 2 nm to 15 nm, the look ahead distance value is in the range of 0.75 nm to 8 nm. For distance values less than 2 nm, the look ahead distance is 0.75 nm, and for distance values greater than 15 nm, the look ahead distance is 8 nm. The equation is designed to reduce the look ahead distance value as the aircraft approaches the selected runway.

While the look ahead distance value based on distance to runway is determined by application of the distance to a selected runway, the remaining two look ahead distance values are determined based on equations relating the ground speed and roll angle of the aircraft and flight characteristics of the aircraft. Specifically, the ground speed look ahead distance value is based on a look ahead time for an assumed turning radius of the aircraft, the ground speed of the aircraft, and the banking and turning radius of the aircraft, while the roll angle look ahead distance value is based on the actual turning radius of the aircraft and the ground speed of the aircraft. The derivation of the equations for these two look ahead values is discussed below.

Figure 11:
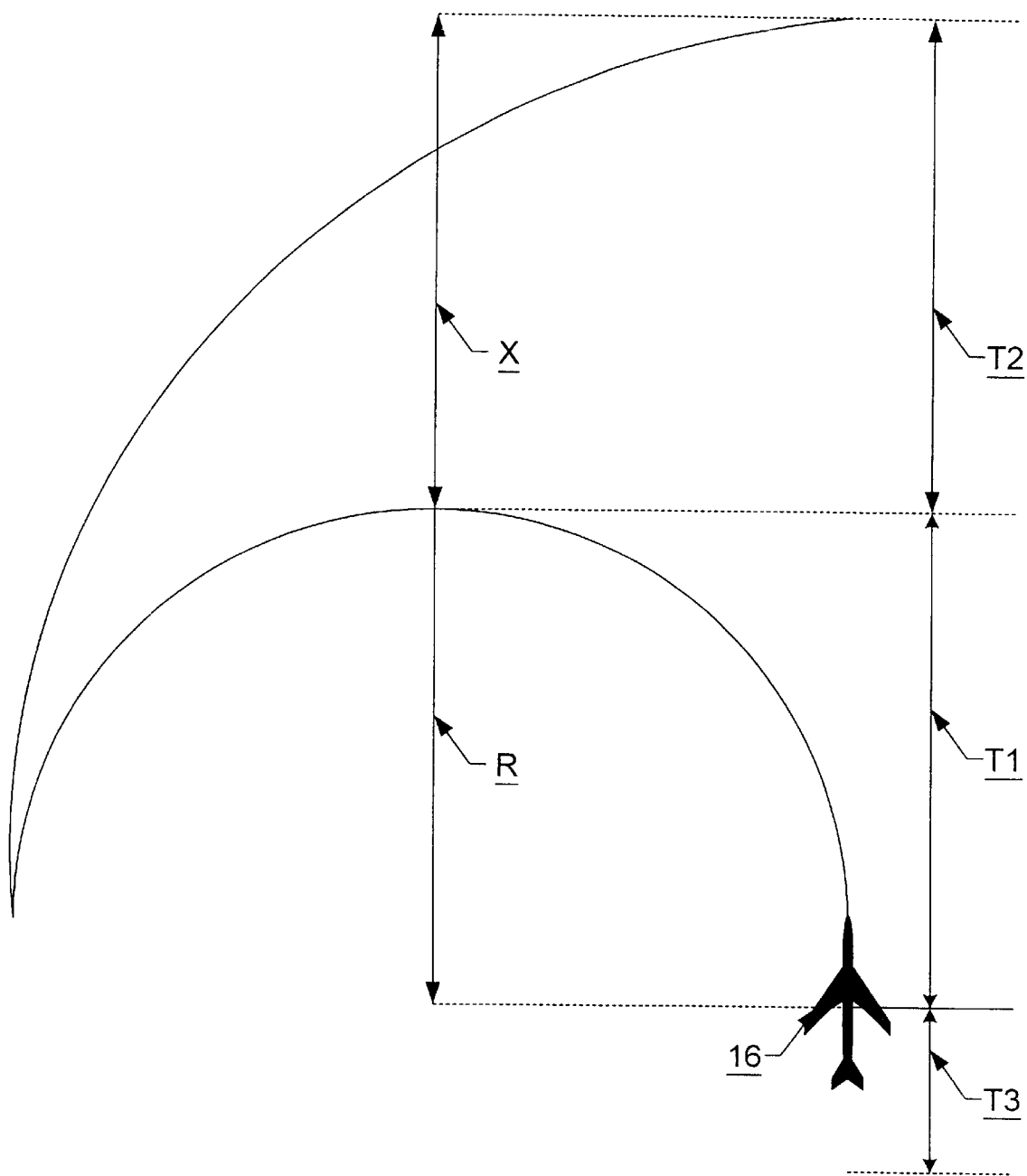
FIG. 11 is a top view illustrating graphically the turning radius and reaction time of an aircraft.

Specifically, FIG. 11 illustrates an aircraft 16, an aircraft turning radius R, either actual or assumed, and various turning and reaction times T1–T3. As discussed, the ground speed look ahead distance is based on an assumed turning radius R, while the roll angle look ahead distance is based on the actual turning radius R of the aircraft. The determination of the ground speed and roll angle look ahead distance values is based on the equation for the turning radius R. The turning radius R is proportional to the square of the ground speed and inversely proportional to the bank angle (Roll):

$$R=Vg^2/(G\times\tan(\text{roll})). \qquad \text{Eq.(1)}$$

The equation for R is used to determine the equations for both look ahead distance values.

As examples, in one embodiment, the ground speed look ahead distance value is based on two assumed turning radii of the aircraft at a bank angle of 30° with an added 10 seconds of reaction time. As shown in FIG. 11, the ground speed look ahead distance, in this embodiment, is equal to the sum of a look ahead time T1 for a single turning radius R; a look ahead time T2 for a terrain clearance; and a predetermined reaction time T3. The terrain clearance T2 is provided to prevent inadvertent terrain contact as a result of the turn. The terrain clearance may be a fixed distance X or it may be equal to the turning radius R of the aircraft.

As shown in FIG. 9, in one embodiment the ground speed look ahead distance value is based on the equation 76:

$$LAD_{Ground\ Speed}=0.00278(Vg)+0.000050568(Vg^2)+K$$

where
  LAD=ground speed look ahead distance in nm,
  Vg=ground speed in kts, and
  K=constant.
The derivation of this equation is discussed in detail in U.S. Pat. No. 5,839,080 to Muller and is also provided below.

Specifically, the turning radius R is proportional to the square of the ground speed and inversely proportional to the bank angle (Roll):

$$R = Vg^2/(G \times \tan(\text{Roll})) \qquad \text{Eq.(1)}$$

where

R=turning radius in nm,
Vg=ground speed in kts,
G=speed of gravity, and
Roll=assumed roll angle of aircraft.

For a bank angle of 30°, the turning radius R in nautical miles (nm) as a function of speed in kts is:

G=32.1741 ft/sec$^2$ or 68624.496 nm/h$^2$
tan(30°)=π/6=0.57735

$$R = 0.000025284(Vg^2) \qquad \text{Eq.(2)}$$

The look ahead time T1 for a single turning radius is:

$$T1 = R/Vg \qquad \text{Eq.(3)}$$

Substituting for R from equation (1) in equation (3), T1 for a single turn radius is:

$$T1 = Vg/(G \times \tan(\text{Roll})) = 0.000025284(Vg) \qquad \text{Eq.(4)}$$

By assuming that the fixed clearance X, (see FIG. 11), is equal to one turning radius R, the total look ahead time for two turn radii, (i.e., T1+T2), is twice the time T1 for a single turning radius. Thus, the total look ahead time is 2(T1) plus a predetermined reaction time T3.

$$T(\text{Total}) = 2(T1) + T3 \qquad \text{Eq.(5)}$$

The reaction time T3 of 10 seconds is equal to:

$$\begin{aligned} T3 &= 10 \text{ sec} \times (1 \text{ kts}) & \text{Eq. (6)} \\ &= 10 \text{ sec} \times (1 \text{ nm/h}) \\ &= 10 \text{ sec} \times (1/3600 \text{ nm/sec}) \\ &= 0.00278 \end{aligned}$$

As such, the total look ahead time is:

$$\begin{aligned} T(\text{Total}) &= 2(T1) + T3 & \text{Eq. (7)} \\ &= 2(0.000025284)Vg + 0.00278. \end{aligned}$$

The ground speed look ahead distance value is determined by multiplying the total time T(Total) of equation (7) by the speed of the aircraft:

$$\text{LAD}_{Ground\ Speed} = Vg \times T(\text{Total})$$

or $$\text{LAD}_{Ground\ Speed} = 0.000050568(Vg^2) + 0.00278(Vg) + K$$

A constant K is added to the equation, which is typically 0.

As opposed to the ground speed look ahead distance, which is based on a theoretical turning radius of the aircraft, the roll angle look ahead distance is based on the actual roll angle of the aircraft and a predetermined reaction time. Specifically, as shown in FIG. 11, the roll angle look ahead distance is equal to the sum of a look ahead time T1 for the actual roll of the aircraft at radius R and a predetermined reaction time T3. For example, in one embodiment of the present invention, the roll look ahead distance is based on the actual roll angle of the aircraft and a reaction time of 5 seconds.

As shown in FIG. 9, in this embodiment the roll angle look ahead distance value is based on the equation 86:

$$\text{LAD}_{Roll\ Angle} = (Vg^2(0.000014598)/\tan(\text{ROLL})) + Vg(0.0013307) + K$$

where

LAD=ground speed look ahead distance in nm,
Vg=ground speed in kts,
K=constant, and
ROLL=actual roll angle of the aircraft.

The derivation of this equation is as follows.

Specifically, as stated previously, the turning radius R is proportional to the square of the ground speed and inversely proportional to the bank angle (Roll):

$$R = Vg^2/(G \times \tan(\text{Roll})) \qquad \text{Eq.(1)}$$

where

R=turning radius in nm,
Vg=ground speed in kts,
G=speed of gravity, and
Roll=roll angle of aircraft.

In the determination of the roll angle look ahead distance, the actual roll angle of the aircraft is used. As such, the roll angle in the equation (1) is the actual roll angle of the aircraft. For the given roll angle of the aircraft, the turning radius R in nautical miles (nm) as a function of speed in kts is for:

G=32.1741 ft/sec$^2$ or 68624.496 nm/h$^2$ $$R = (0.000014598(Vg^2))/\tan(\text{Roll}) \qquad \text{Eq.(8)}$$

The look ahead time T1 for the actual roll angle of the aircraft is:

$$T1 = R/Vg \qquad \text{Eq.(3)}$$

Substituting for R from equation (8) in equation (3), T1 for a single turn radius is:

$$T1 = (0.000014598(Vg))/\tan(\text{Roll}) \qquad \text{Eq.(9)}$$

The reaction time T3 of 5 seconds is equal to:

$$\begin{aligned} T3 &= 5 \text{ sec} \times (1 \text{ kts}) \\ &= 5 \text{ sec} \times (1 \text{ nm/h}) \\ &= 5 \text{ sec} \times (1/3600 \text{ nm/sec}) \\ &= 0.0013307 \end{aligned}$$

As such, the total look ahead time is:

$$T(\text{Total}) = T1 + T3 = ((0.000014598)Vg)/\tan(\text{Roll}) + 0.0013307. \qquad \text{Eq.(10)}$$

The roll angle look ahead distance value is determined by multiplying the total time T(Total) of equation (10) by the speed of the aircraft:

$$LAD_{Roll\ Angle} = Vg \times T(Total)$$

or $$LAD_{Roll\ Angle} = ((0.000014598)Vg^2)/\tan(Roll) + 0.0013307(Vg) + K$$

A constant K is added to the equation, which is typically 0.

As described in detail above, the apparatus, methods, and computer program products of the present invention generate a candidate look ahead distance value that provides a constant reaction time for varying aircraft speeds. This constant reaction time look ahead distance value is compared to other candidate look ahead distance values that have variable reaction times for varying aircraft speeds. If the aircraft is traveling at a relatively high speed, the apparatus, methods, and computer program products of the present invention select the constant reaction time look ahead distance value for use in the ground proximity warning system. Importantly, because the apparatus, methods, and computer program products of the present invention switch from a variable reaction time look ahead distance value to a constant reaction time look ahead distance value when the aircraft is travelling at higher speeds, the present invention can provide a look ahead distance value that reduces nuisance alarms for lower speeds, while also providing desired reaction times for higher speeds. Additionally, the constant reaction time look ahead distance value is selected such that it provides desired reaction times, while at the same time not necessarily enlarging the look ahead distance value to reduce the number of nuisance alarms at higher speeds.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for determining a look ahead distance value for use in a ground proximity warning system, wherein said apparatus comprises a processor that selects, from a plurality of candidate look ahead distance values, a look ahead distance values representing a distance extending about an aircraft within which the ground proximity warning system provides ground proximity alerts, such that for aircraft speeds below a predetermined threshold speed, the reaction time varies with the speed of the aircraft and for aircraft speeds at least as great as The predetermined threshold speed, the reaction time is constant and a constant reaction time look ahead distance value varies as the speed of the aircraft varies.

2. An apparatus according to claim 1, wherein said speed of the aircraft is the ground speed of the aircraft.

3. An apparatus according to claim 1, wherein said look ahead distance value for aircraft speeds at least as great as die predetermined threshold speed is the speed of the aircraft multiplied by a selected constant reaction time.

4. An apparatus according to claim 3, wherein the selected constant reaction time is sixty seconds.

5. An apparatus according to claim 1, wherein said processor compares the selected look ahead distance value to a predetermined maximum look ahead distance value, and wherein if The selected look ahead distance value exceeds the predetermined maximum look ahead distance value, the processor limits the look ahead distance value to the value of The predetermined maximum look ahead distance value.

6. An apparatus according to claim 1, wherein the fraction Time that varies with the sped of the aircraft is selected from The group consisting of a distance to runway look ahead distance value, a ground speed look ahead distance value, and a roll angle look ahead distance value.

7. A method for determining a look ahead distance value for use in a ground proximity warning system, wherein said method comprises selecting from a plurality of candidate look ahead distance values, a look ahead distance value representing a distance extending about an aircraft within which the ground proximity warning system provides ground proximity alerts, such That for aircraft speeds below a predetermined threshold speed the reaction time varies with the speed of the aircraft and for aircraft speeds at least as great as the predetermined threshold speed, the reaction time is constant and a constant reaction time look ahead distance value varies as the speed of the aircraft varies.

8. A method according to claim 7, wherein said speed of the aircraft is the ground speed of the aircraft.

9. A method according to claim 8 further comprising before said selecting step a step of generating the look ahead distance value for aircraft speeds at least as great as the predetermined threshold speed by multiplying the speed of the aircraft by a selected constant reaction time.

10. A method according to claim 9, wherein the selected constant reaction time is sixty seconds.

11. A method according to claim 7, further comprising after said selecting step the steps of:

comparing the selected took ahead distance value to a predetermined maximum look ahead distance value; and limiting the look ahead distance value to the value of the predetermined maximum look ahead distance value, if the selected look ahead distance value exceeds the predetermined maximum look ahead distance value.

12. A method according to claim 7, wherein the look ahead distance value for aircraft speeds below a predetermined threshold speed is selected from the group consisting of a distance to runway look ahead distance value, a ground speed look ahead distance value, and a roll angle look ahead distance value.

13. A computer program product for determining a look ahead distance value for use in a ground proximity warning system, wherein the computer program product comprises:

a computer readable storage medium having computer readable program code means embodied in said medium, said computer-readable program code means comprising first computer instruction means for selecting from a plurality of candidate look ahead distance values, a look ahead distance value repenting a distance extending about an aircraft within which the ground proximity warning system provides ground proximity alerts, such that for aircraft speeds below a predetermined threshold speed, the reaction time varies within the speed of the aircraft and for aircraft speeds at least as great as the predetermined threshold speed, the reaction time is constant and a constant reaction time look ahead distance value varies as the speed of the aircraft varies.

14. A computer program product as defined in claim 13, wherein the speed of the aircraft is the ground speed of the aircraft.

15. A computer program product as defined in claim 14, wherein said computer-readable program code means further comprises second computer instruction means for generating the look ahead distance value for aircraft speeds at least as great as the predetermined threshold speed by multiplying the speed of the aircraft by a selected constant reaction time.

16. A computer program product as defined in claim 15, wherein the selected constant reaction time is sixty seconds.

17. A computer program product as defined in claim 13, wherein said computer-readable program code means further comprises:

third computer instruction means for comparing the selected look ahead distance value to a predetermined maximum look ahead distance value; and fourth computer instruction means for limiting the look ahead distance value to the value of The predetermined maximum look ahead distance value, if the selected look ahead distance value exceeds die predetermined maximum look ahead distance value.

18. A computer program product as defined in claim 13, wherein the look ahead distance value for aircraft speeds below a predetermined threshold speed is selected from the group consisting a distance to runway look ahead distance value, a ground speed look ahead distance value, and a roll angle look ahead distance value.

\* \* \* \* \*